Bigelow & Smith,
Fly Trap,
Nº 22,986. Patented Feb. 15, 1859.

UNITED STATES PATENT OFFICE.

S. W. SMITH, OF BROOKLYN, AND H. BIGELOW, OF NEW YORK, N. Y.

FLY-TRAP.

Specification of Letters Patent No. 22,986, dated February 15, 1859.

*To all whom it may concern:*

Be it known that we, STEPHEN WM. SMITH, of Brooklyn, in the county of Kings and State of New York, and HUBBARD BIGELOW, of the city, county, and State of New York, have invented a new and Improved Trap for Catching and Destroying Flies and other Insects; and we do hereby declare that the following is a full and exact description of the same, reference being had to the accompanying drawing, and to the letters of reference marked thereon, in which—

Figure 1:
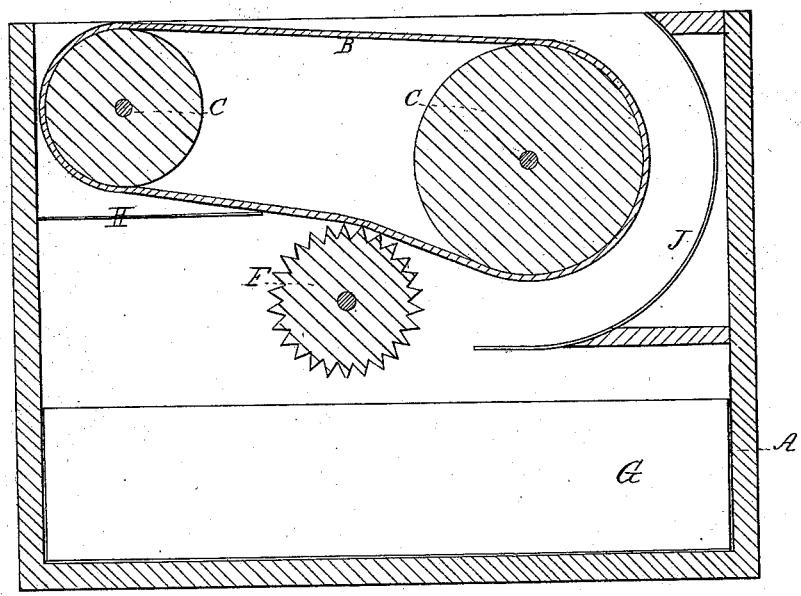
Figure 2:
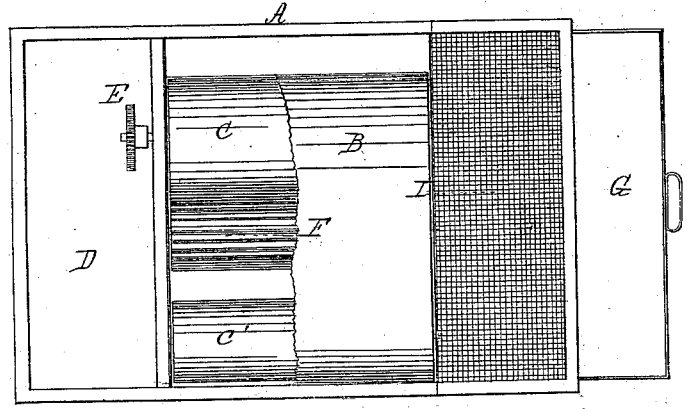

Figure 1 is a vertical section taken at the line X X Fig. 2, and Fig. 2 is a top or plan view.

The object of our invention is to attract the insects to an endless web, kept in motion by machinery, and move the web over a fluted or serrated roller by which they are either killed, stunned or injured, and drop those that are stunned or injured into water or a fluid mixture to destroy them.

A, is the case or box of the trap.

B, is an endless web of cloth or other pliable material, upon the surface of which is a bait of some adhesive substance, like molasses, that will attract the insects to feed upon it while the web is moving. It is stretched over and is moved upon, and by the rollers C, C′, the first of which is operated and revolved from clock work or other moving power placed in the compartment D through the pinion E on the end of its shaft.

F is a fluted or serrated roller, placed beneath and in contact with and operated by the under side of the web B, by which the insects that are on the web at the point and at the time of contact are either killed outright or are stunned or injured so that they will drop, or be removed from the web to drop, into the water or fluid mixture hereinafter described, in and by which they will be destroyed.

G is a pan placed beneath the web B and roller F, which is filled with water alone or with a mixture of water and lime, water and soap, or some other mixture that will destroy the stunned or injured insects that drop into it. The pan is made removable, that it may be taken out to be emptied when required.

H is a plate or scraper which is placed nearby or in contact with the under side of the web to remove from the web the insects that adhere to it, whether killed, stunned, or injured, to drop into the water or mixture in the pan G.

I is a wire-gauze screen to admit light beneath the web and upon the water or mixture in the pan G.

The operation of the trap is as follows. The web B having been put in motion by clock-work, or rather power applied to the roller C, and been baited with some adhesive substance spread upon its surface to attract the insects, and the pan G been filled with water or a mixture as described, the insects that are attracted to and alight or get upon the web are moved by and remain upon it until they come in contact with the points of the serrated or fluted roller F, which either kills them or so stuns or injures them that they cannot escape. Such of the insects as do not drop directly into the mixture in the pan G, but adhere to the web are scraped or removed from the web to drop into the water or mixture by the plate or scraper H. The insects are enticed to remain upon the web while it is in motion by the side J of the trap being darkened, while the space beneath the web is lighted by the light thrown into it through the screen I.

We are aware that traps for catching flies and other insects have been made in which a roller has been used to convey the insects below the roller to an apartment from which they could not escape, but as the insects are not destroyed by them and require to be destroyed after they are thus caught, they do not effect the purposes designed to be produced by the trap herein described.

What we claim as our invention, and desire to secure by Letters Patent is—

1. The combination of the endless web or apron B, with the plate or scraper H, and the rollers C, C′, and F, operated as described, and for the purposes set forth.

2. The combination of the endless web B, with the roller F, and the pan G, in the manner, and for the purpose described.

STEPH. WM. SMITH.
HUBBARD BIGELOW.

Witnesses:
SIDNEY LOW,
M. HASKELL.